March 31, 1970   F. M. RUSSELL   3,504,209
ELECTRIC GENERATORS
Filed Jan. 9, 1967   3 Sheets-Sheet 1

March 31, 1970  F. M. RUSSELL  3,504,209
ELECTRIC GENERATORS
Filed Jan. 9, 1967  3 Sheets-Sheet 2
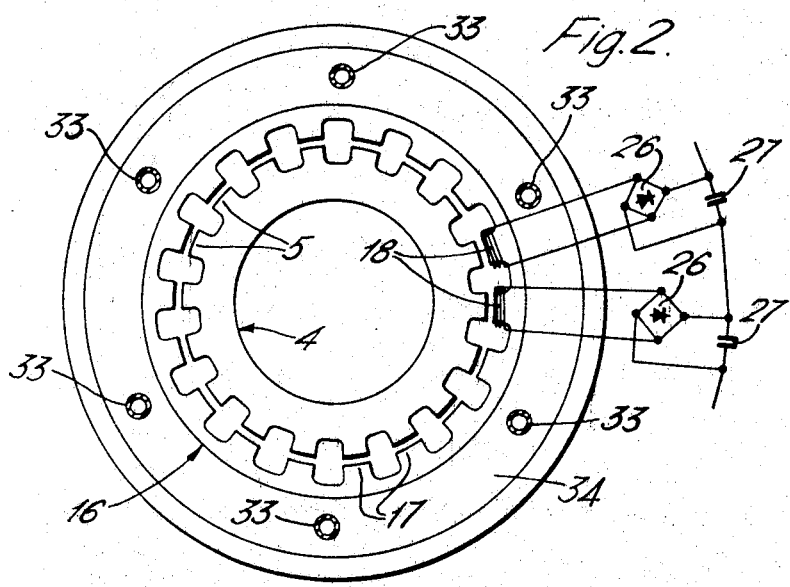
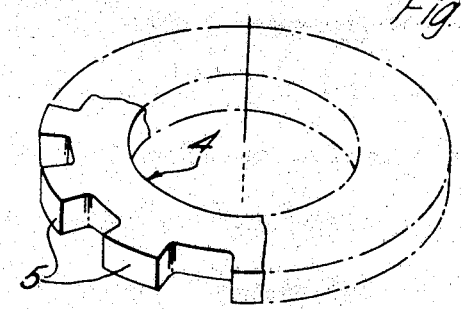
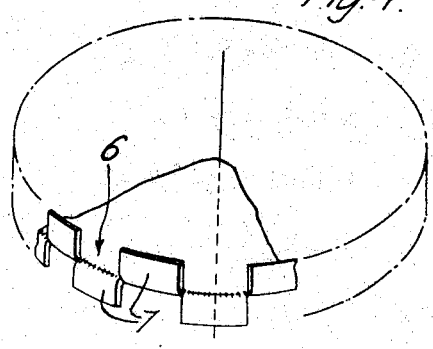

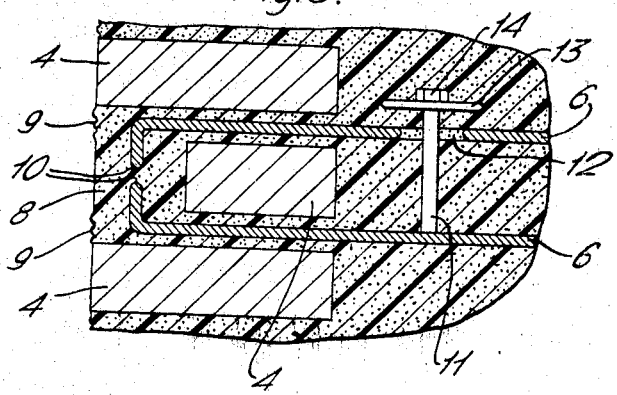
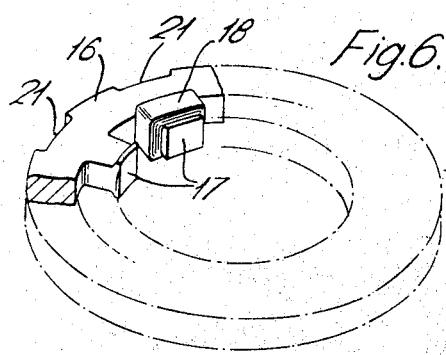
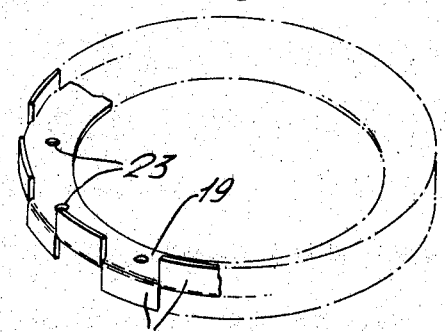
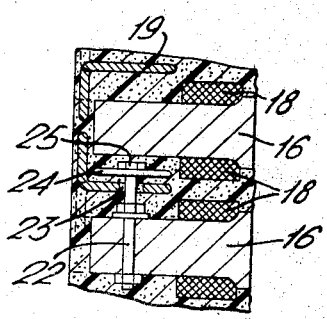

United States Patent Office 3,504,209
Patented Mar. 31, 1970

3,504,209
ELECTRIC GENERATORS
Francis Michael Russell, Abingdon, England, assignor to Science Research Council, London, England
Filed Jan. 9, 1967, Ser. No. 607,965
Claims priority, application Great Britain, Jan. 14, 1966, 1,976/66
Int. Cl. H02k 19/24
U.S. Cl. 310—171                8 Claims

ABSTRACT OF THE DISCLOSURE

The generator comprises a magnetic rotor and a stator. The rotor comprises a stack of magnetic sections electrically insulated from one another and secured together by adhesive synthetic resin. In order that the torque may be transmitted through the stack and disintegration at high rates of rotation resisted, torque transmitting discs are positioned between each magnet section. Flanges at the periphery of the torque transmitting discs project alternately upwardly and downwardly into the spaces between the protruding magnet poles so that torque transmission through the synthetic resin involves a mainly compressive stress and not a shear stress. The stator has a complementary construction and includes coils in which currents are induced when the rotor rotates, the currents being rectified and used to charge capacitors whose outputs are added to produce the high output voltage.

BACKGROUND OF THE INVENTION

This invention relates to electric generators, and more particularly to electric generators capable of producing direct current at a high voltage.

A requirement for such a generator has arisen in connection with a new form of separated orbit cyclotron, in which the power to accelerate a pulsed beam of charged particles is derived from pulsed beams of very high energy electrons which are circulated through the cavities of the cyclotron in an orbit outside the outermost turn of the spiral path followed by the charged particles. The required beams of electrons are accelerated in linear accelerators prior to entering the cyclotron and the generator is required to provide the electric power to energise the accelerating electrodes of these accelerators.

It is therefore an object of the present invention to provide a new or improved electric generator capable of producing direct current at a high voltage.

SUMMARY OF THE INVENTION

According to the present invention, an electric generator comprises a rotor formed by an electrically-insulating shaft made up of a plurality of annular magnet sections having outwardly projecting pole pieces the polarities of which alternate around each section, a torque-transmitting disc interposed between each adjacent pair of magnet sections with its general plane normal to the axis of the rotor, each said disc being secured to the adjacent magnet sections and electrically-insulated therefrom by a synthetic resinous material, a stator coaxial with the rotor and made up of a plurality of annular sections having inwardly projecting projections, the number of stator sections being equal to the number of rotor magnet sections, each projection of the stator sections having a coil wound thereon, the arrangement being such that alternating currents are developed in said coils as the rotor is rotated, and rectifier means associated with each said coil to rectify the alternating current developed in that coil to provide a unidirectional output.

Preferably a torque-resisting annulus is interposed between each adjacent pair of stator sections, each said annulus having its general plane normal to the axis of the stator and rotor, and each said annulus being secured to the adjacent stator section and electrically-insulated therefrom by a synthetic resinous material.

Preferably each said torque-transmitting disc in the rotor has a first plurality of edge portions, equal in number to the number of pole pieces on each rotor magnet section, all projecting in the same direction normal to the general plane of the disc, said edge portions lying in the gaps between the pole pieces of the rotor magnet section on one side of the disc, each said disc also having a second plurality of edge portions, equal in number to the first plurality, all projecting in the same direction normal to the general plane of the disc, this direction being opposite to the direction of the first plurality of edge portions, said second plurality of edge portions lying in the gaps between the pole pieces of the magnet section on the other side of the disc.

Preferably each stator section has a plurality of recesses in its outer periphery and each said torque-transmitting annulus in the stator has a first plurality of edge portions equal in number to the number of recesses on each stator section all projecting in the same direction normal to the general plane of the annulus, said edge portions lying in said recesses in the stator section on one side of the annulus, each said annulus also having a second plurality of edge portions, equal in number to the first plurality, all projecting in the same direction normal to the general plane of the annulus, this direction being opposite to the direction of the first plurality of edge portions, said second plurality of edge portions lying in said recesses in the stator section on the other side of the annulus.

BRIEF DESCRIPTION OF THE DRAWINGS

An electric generator in accordance with the present invention will now be described by way of example with reference to the accompanying drawings, in which:

FIGURE 2 shows a diagrammatic cross-section through the generator,

FIGURES 3 and 4 show broken-away views of parts of the generator,

FIGURE 5 shows a more detailed cross section of part of the generator,

FIGURES 6 and 7 show broken-away views of other parts of the generator, and

FIGURE 8 shows another more detailed cross-section of part of the generator.

DESCRIPTION OF THE PREFERRED EMBODIMENT

Figure 1:
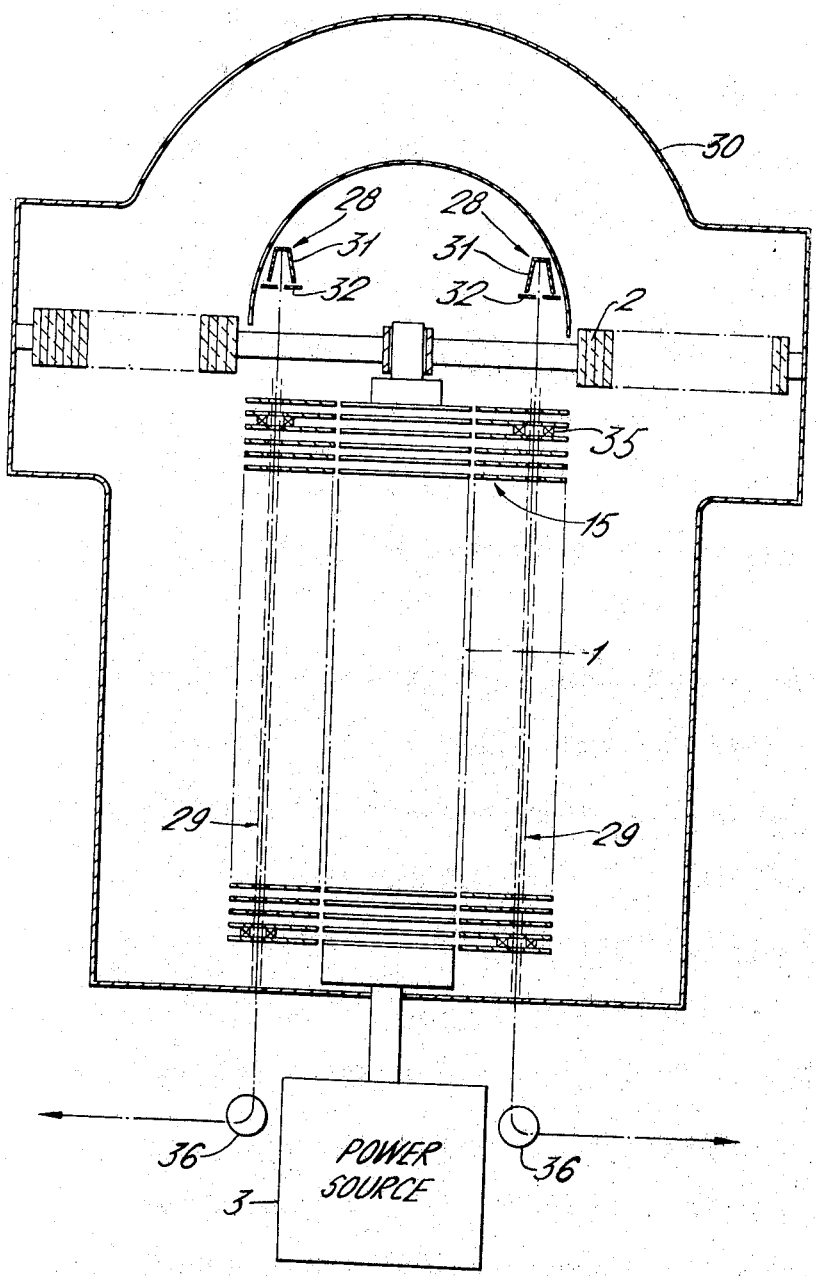
FIGURE 1 shows a diagrammatic axial section through the generator.

The generator to be described is for use in association with a new form of separated orbit cyclotron, in which the power to accelerate a pulsed beam of charged particles is derived from pulsed beams of very high energy electrons which are circulated through the cavities of the cyclotron in an orbit outside the outermost turn of the spiral path followed by the charged particles. The required beams of electrons are accelerated in linear accelerators prior to entering the cyclotron and the generator is required to provide the electric power to energise the accelerating electrodes of these accelerators. Clearly, it is not essential to the invention that the electron beams produced are used in a separated orbit cyclotron, and in fact the generator may well be used not to produce electron beams but merely to produce direct current at high voltage.

The generator itself will therefore be described first, brief mention then being made of the arrangements for producing and accelerating the electron beams.

Referring to FIGURE 1, the generator comprises a vertically mounted electrically-insulating rotor 1 held by an electrically-insulating bearing 2 at its upper end, and driven by a motive power source 3 at its lower end. The rotor 1 is some 2 metres in diameter and is driven by the power source 3 at a speed of some 2000 revolutions per minute. The power source 3 may be some form of turbine or any other suitable form of power source. The rotor 1 is held in compression and this may conveniently be achieved by arranging that the supports for the bearing 2 are inclined.

Referring also to FIGURES 2 and 3, the rotor 1 is made up of a series of generally flat, annular, permanent magnet sections 4, each of which has 18 pole pieces 5 of alternate polarity projecting from its periphery. The outer face of each pole piece 5 is some 15 cms. square and the gap between adjacent pole pieces 5 is some 17 cms. To connect the magnet sections 4 together and to transmit the torque along the rotor 1, torque-transmitting discs 6 are interposed between each adjacent pair of magnet sections 4, a portion of a disc 6 being shown in FIGURE 4. The discs 6 are made of a non-magnetic metal such as titanium or stainless steel. Each disc 6 has adjacent portions 7 of its edge turned alternately upwards and downwards so as to be normal to the general plane of the disc 6. The width and spacing of the portions 7 is such that they fit readily into the gaps between the pole pieces 5 of the magnet sections 4.

Referring to FIGURE 5, this shows a cross-section through a part of the rotor 1 comprising three adjacent magnet sections 4. The magnet sections 4 and the discs 6 are secured together but maintained electrically-insulated from one another by being embedded in epoxy resin 8, the outer surface of the resin 8 being smoothly cylindrical to minimise viscosity losses as the rotor 1 rotates, but having corrogations 9 parallel to the axis of the rotor 1 so as to impede surface tracking. In addition, the adjacent ends of the portions 7 of the discs 6 are rounded as indicated at 10 to prevent electrical breakdown between them.

Each disc 6 has three symmetrically-arranged tie rods 11 projecting from one side of it, these rods 11 passing through smoothly-edged apertures 12 in the next adacent disc 6 and being capped by discs 13 held in place by bolts 14. The tie rods 11, discs 13 and bolts 14 are all surrounded by the resin 8 so as to be electrically-insulated from the discs 6, but they nevertheless increase the torsional rigidity of the rotor 1 considerably.

Referring again to FIGURES 1 and 2, the rotor 1 rotates within a stator 15 formed by a plurality of stator sections 16 equal in number to, and adjacent in position to, the magnet sections 4. Referring to FIGURE 6, which shows a broken-away view of part of a stator section 16, each stator section 16 has a plurality of inwardly-projecting projections 17, equal in number to the pole pieces 5 on a magnet section 4 (FIGURE 2) and similarly disposed. On each projection 17 is wound a coil 18. To connect the stator sections 16 together and to adsorb the torsional forces in the stator 15, torque-resisting annuli 19 are interposed between each adjacent pair of stator sections 16, a portion of an annulus 19 being shown in FIGURE 7. The annuli 19 are made of a non-magnetic metal such as titanium or stainless steel. Each annulus 19 has adjacent portions 20 of its outer edge turned alternately upwards and downwards so as to be normal to the general plane of the annulus 19. Referring also to FIGURE 6, the width and spacing of the portions 20 is such that they fit readily into recesses 21 formed in the outer surfaces of the stator sections 16.

Referring to FIGURE 8, this shows a cross-section through a part of the stator 15 comprising two stator sections 16. The stator sections 16 and the annuli 19 are secured together but maintained electrically-insulated from one another by being embedded in epoxy resin. Each stator section 16 has 18 symmetrically-arranged tie rods 22 projecting on alternate sides of it, these rods 22 passing through apertures 23 in the adjacent annuli 19 on each side of the stator section 16. Each rod 22 is capped by a disc 24 held in place by a bolt 25. The tie rods 22, discs 24 and bolts 25 are all surrounded by epoxy resin so as to be electrically-insulated from the annuli 19, but they nevertheless greatly increase the resistance of the stator 16 to torsional forces.

Referring again to FIGURE 2, across each coil 18 is connected a bridge rectifier 26 and a smoothing capacitor 27. As the rotor 1 is rotated, therefore, alternating currents are induced in the coils 18 and these currents are rectified and smoothed to produce direct current potentials across the capacitors 27. These potentials are summed in series around each stator section 16, the last capacitor 27 associated with one stator section 16 being connected to the first capacitor 27 associated with the next adjacent stator section 16, so that the potentials are summed in series throughout the length of the stator 15 to provide the required direct current output.

It will be appreciated that numerous modifications may be made to the generator described above whilst remaining within the scope of the invention, and three such modifications will be very briefly mentioned.

Firstly, referring to FIGURE 2, it is not essential that the number of projections 17 on the stator sections 16 be equal to the number of pole pieces 5 on the rotor magnet sections 4. For example, there may be two more projections 17 than pole pieces 5. The effect of this is that the alternating currents induced in the coils 18 are out of phase with one another, and this reduces the ripple in the output direct current.

Secondly, again referring to FIGURE 2, a multiphase connection of the coils 18 may be used.

Thirdly, referring to FIGURE 1, the rotor 1 may be of the induction type instead of being permanent magnetic.

Referring again to FIGURES 1 and 2, in the case where the generator is to be used in association with a cyclotron as previously mentioned, the electron beams are generated by electron sources 28 and are accelerated by linear accelerators 29. In this case the whole device is housed in a vessel 30 filled with a gas, such as sulphur hexafluoride, at high pressure.

The electron sources 28 are mounted near the top of the vessel 30, and each one is formed by an electron gun 31 and a modulating grid 32. In operation large numbers of electrons are emitted by the guns 31 and the velocity of these electrons is modulated by sinusoidally-varying radio-frequency signals supplied to the grids 32 such that the electrons emerge from the guns 28 in bunches or pulses which pass into the accelerators 29.

Each accelerator 29 comprises an evacuated glass tube 33 which passes down the length of the stator 15. Metal annuli 34 encircle each stator section 16 and form the electrodes for the accelerators 29, these electrodes being energized by potentials derived from the coils 18 after rectification and smoothing, as described above. In this case, however, the potentials are summed in series around each stator section 16 as before, but the first capacitor 27 associated with each stator section 16 is connected to the associated annulus 34, and the last capacitor 27 associated with each stator section 16 is connected to the annulus 34 associated with the next adjacent stator section 16. In this way successive electrodes of each accelerator 29 have applied to them successively increasing potentials, so that the desired acceleration of the electron beams is achieved.

Some at least of the electrodes have quadruple focussing magnets 35 and the accelerated electron beams are passed to the cyclotron by way of bending magnets 36.

I claim:
1. An electric generator comprising a rotor formed by an electrically-insulating shaft made up of a plurality of annular magnet sections having outwardly projecting pole pieces the polarities of which alternate around each section, a torque-transmitting member interposed between each adjacent pair of magnet sections each said member being secured to the adjacent magnet sections and electrically-insulated therefrom by a synthetic resinous material, the said members each having projections which cooperate with recesses in the magnet sections so that torque transmission stresses upon the synthetic resinous material are principally compressive, a stator coaxial with the rotor and made up of a plurality of annular sections having inwardly projecting projections upon each of which a coil is wound, the arrangement being such that alternating currents are developed in said coils as the rotor is rotated, and rectifier means associated with each said coil to rectify the alternating current developed in that coil to provide a unidirectional output.

2. A generator in accordance with claim 1 wherein the number of projections on each stator section is equal to the number of pole pieces on each rotor magnet section.

3. A generator in accordance with claim 2 wherein said rotor magnet sections are permanent magnetic.

4. A generator in accordance with claim 3 wherein each said torque transmitting member in the rotor comprises a disc having a first plurality of edge portions, equal in number to the number of pole pieces on each rotor magnet section, all projecting in the same direction normal to the general plane of the disc, said edge portions lying in the gaps between the pole pieces of the rotor magnet section on one side of the disc, each said disc also having a second plurality of edge portions, equal in number to the first plurality, all projecting in the same direction normal to the general plane of the disc, this direction being opposite to the direction of the first plurality of edge portions, said second plurality of edge portions lying in the gaps between the pole pieces of the magnet section on the other side of the disc.

5. A generator in accordance with claim 4 wherein each said torque-transmitting disc has a plurality of tie rods extending from it normal to the general plane of the disc, and each said disc has a plurality of apertures therein, each said tie rod extending through an aperture in an adjacent disc but being electrically-insulated therefrom by said resinous material.

6. A generator in accordance with claim 5 wherein a torque-resisting annulus is interposed between each adjacent pair of stator sections, each said annulus having its general plane normal to the axis of the stator and rotor, and each said annulus being secured to the adjacent stator section and electrically-insulated therefrom by a synthetic resinous material.

7. A generator in accordance with claim 6 wherein each stator section has a plurality of recesses in its outer periphery and each said torque-resisting annulus in the stator has a first plurality of edge portions equal in number to the number of recesses on each stator section all projecting in the same direction normal to the general plane of the annulus, said edge portions lying in said recesses in the stator section on one side of the annulus, each said annulus also having a second plurality of edge portions, equal in number to the first plurality, all projecting in the same direction normal to the general plane of the annulus, this direction being opposite to the direction of the first plurality of edge portions, said second plurality of edge portions lying in said recesses in the stator section on the other side of the annulus.

8. A geneartor in accordance with claim 7 wherein each said stator section has a plurality of tie rods extending from it normal to the general plane of the stator section, and each said torque-resisting annulus has a plurality of apertures therein, each said tie rod extending through an aperture in an adjacent annulus but being electrically-insulated therefrom by said resinous material.

References Cited
UNITED STATES PATENTS

| | | | |
|---|---|---|---|
| 908,097 | 12/1908 | Herz | 310—156 |
| 2,293,951 | 8/1942 | Seastone et al. | 310—217 |
| 2,516,114 | 7/1950 | Green | 310—156 |
| 3,139,547 | 6/1964 | Shafranek et al. | 310—156 |

MILTON O. HIRSHFIELD, Primary Examiner

LAWRENCE A. ROUSE, Assistant Examiner

U.S. Cl. X.R.

310—180